(12) United States Patent
Ishii et al.

(10) Patent No.: US 7,904,239 B2
(45) Date of Patent: Mar. 8, 2011

(54) TRAVEL ROUTE DISPLAY SYSTEM (75) Inventors: Miyuki Ishii, Tokyo (JP); Yoshinori Nakatsuka, Tokyo (JP); Mitsukatsu Nagashima, Tokyo (JP); Yoshihito Ibe, Tokyo (JP)

(73) Assignee: Pioneer Corporation, Tokyo (JP)

( * ) Notice: Subject to any disclaimer, the term of this patent is extended or adjusted under 35 U.S.C. 154(b) by 963 days.

(21) Appl. No.: 11/719,369

(22) PCT Filed: Nov. 15, 2005

(86) PCT No.: PCT/JP2005/020941
§ 371 (c)(1),
(2), (4) Date: May 15, 2007

(87) PCT Pub. No.: WO2006/051982
PCT Pub. Date: May 18, 2006

(65) Prior Publication Data
US 2009/0082958 A1   Mar. 26, 2009

(30) Foreign Application Priority Data
Nov. 15, 2004   (JP) .................................. 2004-331279

(51) Int. Cl.
*G01C 21/30* (2006.01)
(52) U.S. Cl. ....................................................... 701/208
(58) Field of Classification Search .................. 701/200, 701/201, 202, 208–209; 340/990, 994, 995.1, 340/995.12, 995.16–995.19, 995.24, 995.26, 340/995.27
See application file for complete search history.

(56) References Cited

U.S. PATENT DOCUMENTS

| 6,336,072 | B1 | 1/2002 | Takayama et al. | |
|---|---|---|---|---|
| 6,697,731 | B2 | 2/2004 | Takayama et al. | |
| 6,748,316 | B2 | 6/2004 | Takayama et al. | |
| 2001/0056443 | A1* | 12/2001 | Takayama et al. | 707/513 |
| 2002/0099499 | A1 | 7/2002 | Takayama et al. | |
| 2002/0103597 | A1 | 8/2002 | Takayama et al. | |

FOREIGN PATENT DOCUMENTS

| JP | 2001-195459 A | | 7/2001 |
|---|---|---|---|
| JP | 2001-236353 A | | 8/2001 |
| JP | 2002-073756 | * | 3/2002 |
| JP | 2002-73756 A | | 3/2002 |
| JP | 2003-247841 A | | 9/2003 |
| JP | 2003-247842 A | | 9/2003 |
| JP | 2003-248713 A | | 9/2003 |
| JP | 2004-139560 A | | 5/2004 |

* cited by examiner

*Primary Examiner* — Kim T Nguyen
(74) *Attorney, Agent, or Firm* — Foley & Lardner LLP (57) ABSTRACT

A travel route display system executes a searching step of searching a database based on a given search condition; a numerical data calculating step of executing a predetermined calculation on a result obtained at the searching step to calculate numerical data displayed together with a travel route; an image data generating step of generating a plurality of kinds of image data for displaying the travel route on a screen, the generation being based on results obtained at the searching and calculating steps; a display image controlling step of so controlling the plurality of kinds of image data that an individual piece of image data or a synthesis of a plurality of image data can be displayed on the same screen, the plurality of kinds of image data being obtained at the generating step; and an image data displaying step of displaying the image data controlled at the controlling step.

9 Claims, 12 Drawing Sheets

TRAVEL ROUTE DISPLAY SYSTEM

TECHNICAL FIELD

The present invention relates to a travel route display system, a travel route display controller, a travel route display terminal apparatus, a travel route display method, and a travel route display program that display the details of a travel route all together on the same screen. Utilization of the present invention is not limited to the travel route display system, the travel route display controller, the travel route display terminal apparatus, the travel route display method, and the travel route display program.

BACKGROUND ART

A conventional travel route making support apparatus has been suggested that displays various facilities located on a route between a departure point and a destination to enable a user to make an efficient travel plan (for example, Patent Documents 1 to 3).

Patent Document 1: Japanese Patent Application Laid-Open Publication No. 2003-248713
Patent Document 2: Japanese Patent Application Laid-Open Publication No. 2003-247842
Patent Document 3: Japanese Patent Application Laid-Open Publication No. 2003-247841

DISCLOSURE OF THE INVENTION

Problems to Be Solved by the Invention

According to the conventional technology including techniques disclosed in the above patent documents, however, only the summary information of a travel route is listed on one screen, so that a user cannot look over detailed information of facilities on the travel route unless changing the screen for every facility. As a result, the summary information of travel route and the detailed information of facilities are each provided as a fragmented piece of information, which makes the displayed information difficult for the user to understand and to handle.

Means for Solving the Problems

A travel route display system according to claim 1 includes a server and a user terminal that are connected via a network. The server includes a search condition obtaining unit that obtains a given search condition transmitted from the user terminal; a database that stores various pieces of information for displaying a travel route; an information searching unit that searches the database based on the search condition obtained by the search condition obtaining unit; a numerical-data calculating unit that calculates various numerical data based on information obtained as a result of the search into the database, the numerical data being displayed together with the travel route; an image data generating unit that generates a plurality of kinds of image data for displaying the travel route, using the information obtained from the result of the search into the database by the information searching unit and the numerical data calculated by the numerical-data calculating unit; and an image data transmitting unit that transmits the plurality of kinds of image data to the user terminal, the image data being generated by the image data generating unit. The user terminal includes a search condition input unit that receives input of a given search condition; a search condition transmitting unit that transmits the search condition to the server, the search condition being input through the search condition input unit; an image data obtaining unit that obtains a plurality of kinds of image data transmitted from the image data transmitting unit; a display image controlling unit that so controls the plurality of kinds of image data that an individual piece of image data or a synthesis of a plurality of image data can be displayed on the same screen, the plurality of kinds of image data being obtained by the image data obtaining unit; and a display unit that displays the image data controlled by the display image controlling unit.

Moreover, a travel route display controller according to claim 6 is composed of the server according to claim 1.

Furthermore, a travel route display terminal apparatus according to claim 7 is composed of the user terminal according to claim 1.

A travel route display method according to claim 8 includes a search condition obtaining step of obtaining a search condition necessary for displaying a travel route; a searching step of searching a database based on the search condition obtained at the search condition obtaining step; a numerical data calculating step of carrying out a predetermined calculation on a result obtained at the searching step to calculate numerical data displayed together with the travel route; an image data generating step of generating a plurality of kinds of image data for displaying the travel route on a screen, the generation being based on results obtained at the searching step and numerical data calculating step; a display image controlling step of controlling the plurality of kinds of image data that an individual piece of image data or a synthesis of a plurality of image data can be displayed on the same screen, the plurality of kinds of image data being generated at the image data generating step; and a display step of displaying the image data controlled at the display image controlling step.

A travel route display program according to claim 9 causes a computer to execute the travel route display method according to claim 8.

EXPLANATIONS OF LETTERS OR NUMERALS 100 network
101 server
102, 103, 104, 105 user terminal
201 search condition obtaining unit
202, 504 database
202a, 504a transportation information database
202b, 504b facility information database
202c, 504c map database
203 information searching unit
204 numerical-data calculating unit
205 image data generating unit
205a transportation-information image-data generating unit
205b facility-information image-data generating unit
205c map image-data generating unit
206 data transmitting unit
301 operation/input unit
302 search condition transmitting unit
303 data receiving unit
304 display image controlling unit
305 display unit
501, 601 CPU
502, 602 ROM
503, 603 RAM
505, 609 communication I/F (interface)
604 memory
605 display
606 keyboard
607 mouse
608 printer

BEST MODE(S) FOR CARRYING OUT THE INVENTION

Exemplary embodiments of a travel route display system, a travel route display controller, a travel route display terminal apparatus, a travel route display method, and a travel route display program according to the present invention will now be described in detail with reference to the accompanying drawings.

<Outline Configuration of Travel Route Display System>

Figure 1:
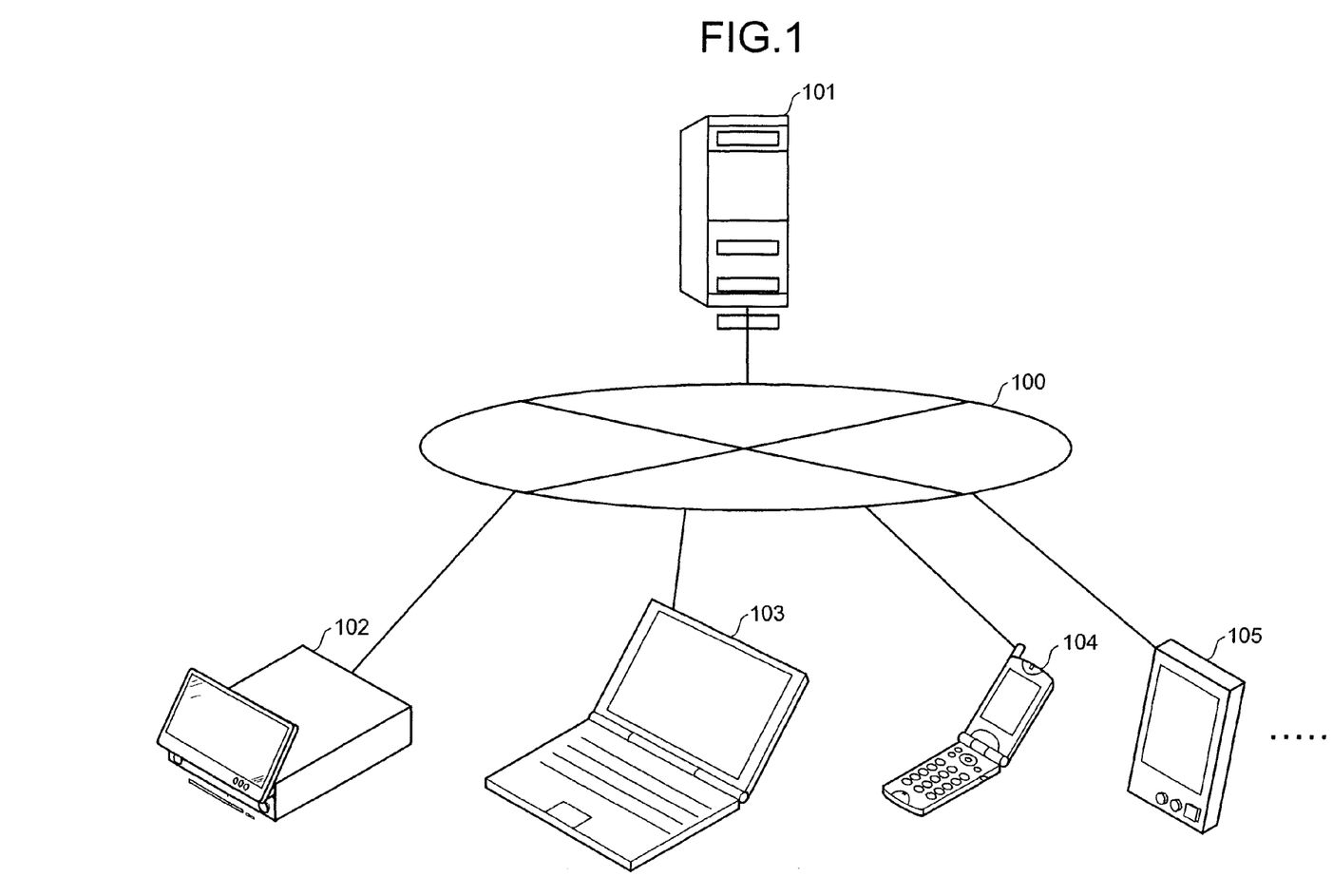
FIG. 1 is a diagram of the outline configuration of a travel route display system according to an embodiment of the present invention.

The outline configuration of a travel route display system according to an embodiment of the present invention will first be described. FIG. 1 is a diagram of the outline configuration of the travel route display system according to the embodiment of the present invention. The travel route display system is composed of a server 101 connected to a network 100, and user terminals 102, 103, 104, 105, . . . . Computers, cellular phones, navigation devices, personal digital assistants (PDA), etc. are used as the user terminals 102, 103, 104, 105, <Functional Configuration of Travel Route Display System>

Figure 2:
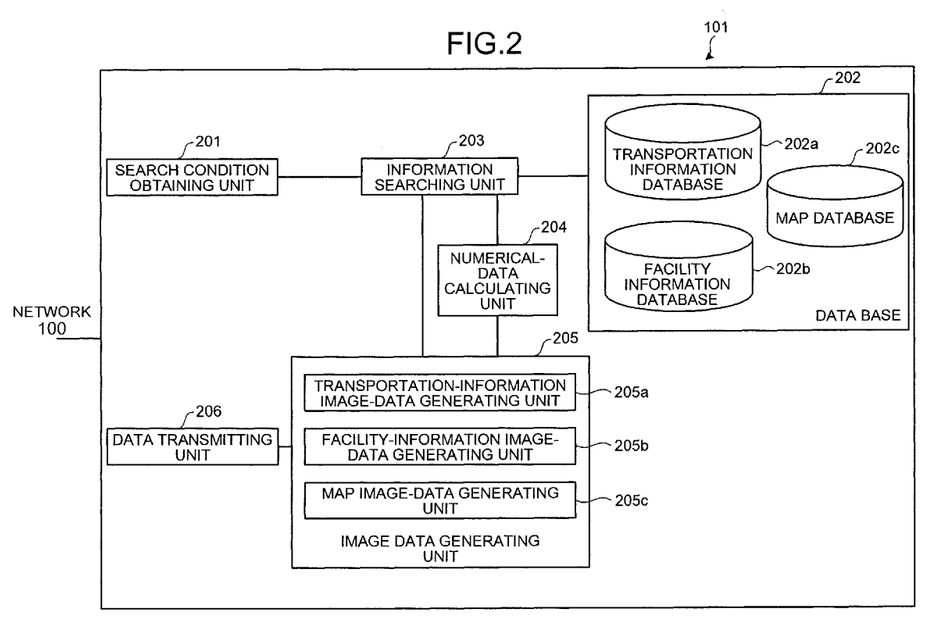
FIG. 2 is a block diagram of the functional configuration of a server.

A functional configuration of the travel route display system according to the embodiment of the present invention will then be described. The functional configuration of the server composing the travel route display system will first be described. FIG. 2 is a block diagram of the functional configuration of the server. The server 101 includes a search condition obtaining unit 201, a database 202, an information searching unit 203, a numerical-data calculating unit 204, an image data generating unit 205, and a data transmitting unit 206.

The search condition obtaining unit 201 obtains a search condition (e.g., a search word including a place name or a station name representing a departure point, a destination, etc., a date of departure, a transportation to be used, and a name of a desired facility) via the network 100. The search condition is transmitted from, for example, the user terminal 102, and is used for displaying a travel route desired by a user.

The database 202 includes a transportation information database 202a that stores various pieces of information such as transportations including train, bus, ship, and airplane, and information of schedules, fares, and service distances of the transportations, a facility information database 202b that stores various pieces of information such as tourist facilities, theme parks, restaurants, and accommodations, and map database 202c that stores map information.

The information searching unit 203 searches the database 202 based on the search condition obtained by the search condition obtaining unit 201.

The numerical-data calculating unit 204 calculates various numerical data, which is displayed together with the travel route, based on information obtained as a result of the search into the database 202 by the information searching unit 203. Based on the information obtained from the database 202, for example, the numerical-data calculating unit 204 calculates the total of transportation fares and service charges for facilities to be used, a time required for transportations to be used and for the entire travel schedule, a time for transportation transfer, a travel distance, etc.

The image data generating unit 205 includes a transportation-information image-data generating unit 205a, a facility-information image-data generating unit 205b, and a map image-data generating unit 205c. The transportation-information image-data generating unit 205a generates image data for displaying a transportation icon that represents a transportation searched out from a transportation information database 202a. At the same time, the transportation-information image-data generating unit 205a also generates image data that indicate the numerical value of a time required for the transportation, a time for transportation transfer, a necessary fare, a service distance, etc. (calculated by the numerical-data calculating unit 204) in a case of the use of the transportation to be displayed near the transportation icon.

The facility-information image-data generating unit 205b generates image data for displaying a facility icon that represents each facility searched out from a facility information database 202b. At the same time, the facility-information image-data generating unit 205b generates image data that indicate the numerical value of a service charge required for the facility (calculated by the numerical-data calculating unit 204) and that is to be displayed near the facility icon. The map image-data generating unit 205c generates image data for displaying a map searched out from a map database 202c. At the same time, the map image-data generating unit 205c generates image data that indicate the numerical value of the distance between facilities to be used, and a travel distance in the entire travel route (calculated by the numerical-data calculating unit 204).

The data transmitting unit 206 transmits the image data generated by the image data generating unit 205 to, for example, the user terminal 102 via the network 100.

Figure 3:
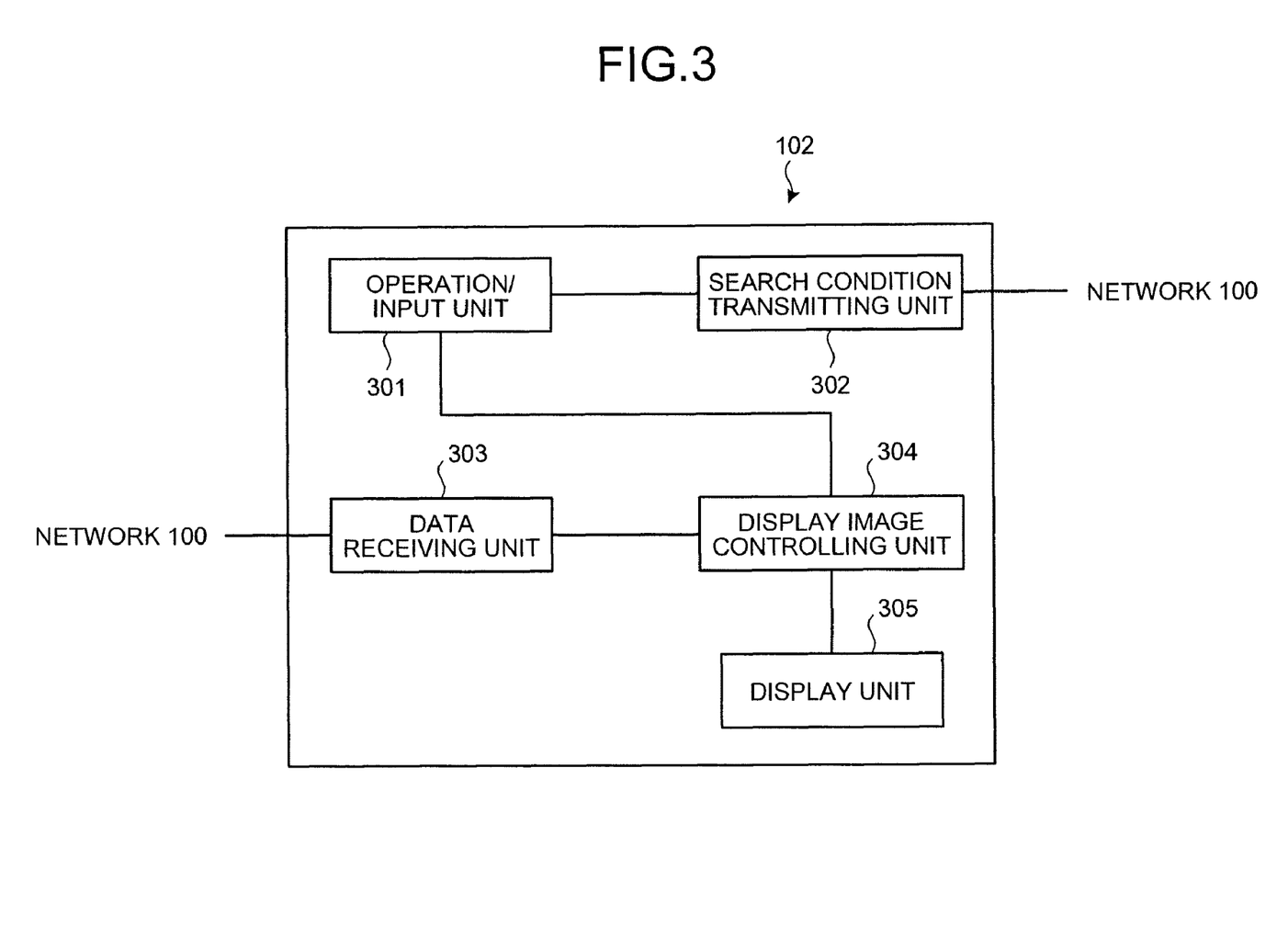
FIG. 3 is a block diagram of the functional configuration of a user terminal.

The functional configuration of the user terminal composing the travel route display system according to the embodiment of the present invention will then be described. FIG. 3 is a block diagram of the functional configuration of the user terminal. Since each of the user terminals 102, 103, 104, 105, ... shown in FIG. 1 has the same function, only the user terminal 102 will be described in detail. The user terminal 102 includes an operation/input unit 301, a search condition transmitting unit 302, a data receiving unit 303, a display image controlling unit 304, and a display unit 305.

The operation/input unit 301 carries out a process of inputting a search condition (e.g., a search word including a place name and/or station name representing a departure point, a destination, etc., a date of departure, a transportation to be used, and a name of a desired facility) necessary for displaying a travel route, an operation of changing various functions, etc. The search condition transmitting unit 302 transmits the search condition input from the operation/input unit 301 to the server 101 via the network 100. The data receiving unit 303 receives image data that is transmitted from the server 101 via the network 100.

The display image controlling unit 304, following operation input to the operation/input unit 301, controls a process of displaying a plurality of kinds of image data received by the data receiving unit 303. For example, the display image controlling unit 304 so controls the display process as to display individual piece of received image data representing the travel route or a synthesis of a plurality of pieces of image data on the same screen, and as to display images exhibiting simplified information and detailed information hierarchically. The display unit 305 displays the image data.

<Procedure of Processes Executed by Travel Route Display System>

Figure 4:
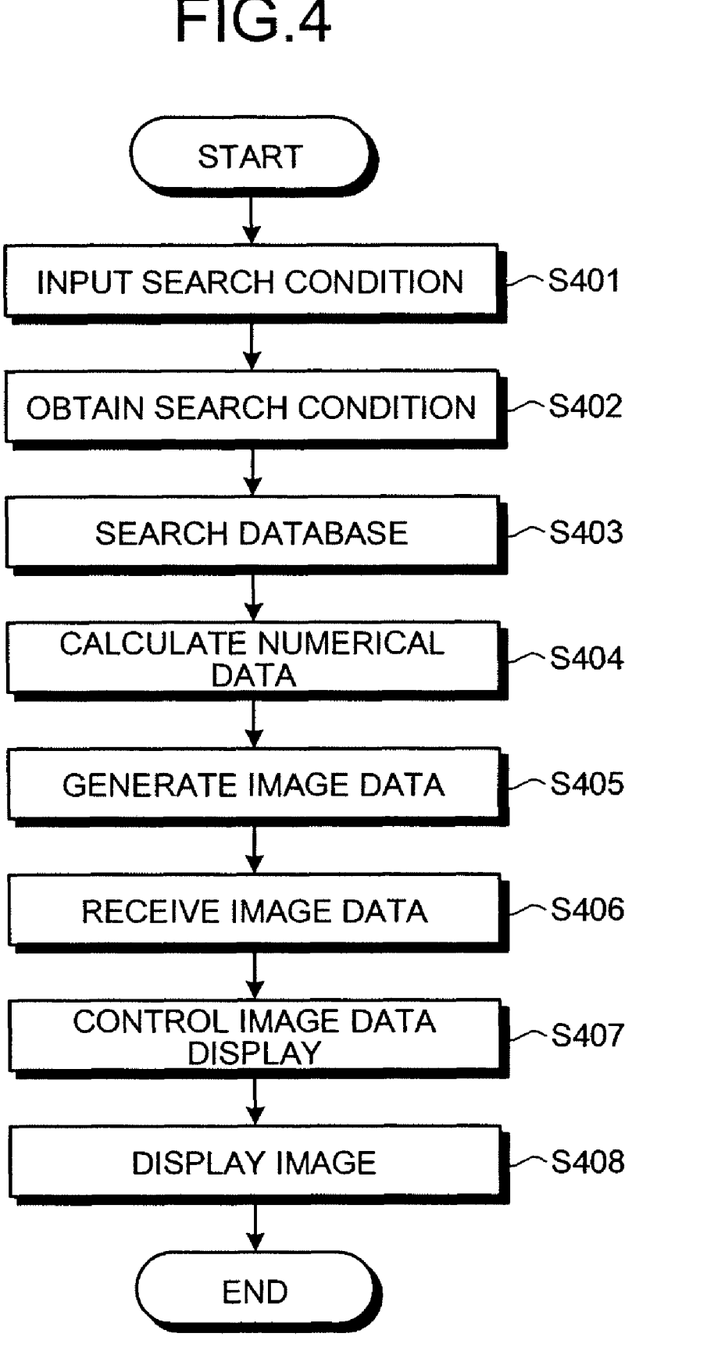
FIG. 4 is a flowchart of an example of a procedure of processes executed by the travel route display system according to the embodiment of the present invention.

A procedure of processes executed by the travel route display system according to the embodiment of the present invention will then be described. FIG. 4 is a flowchart of an example of the procedure of processes executed by the travel route display system according to the embodiment of the present invention.

At the start of the flowchart shown in FIG. 4, a user puts a search condition into the operation/input unit 301 of the user terminal 102, which search condition includes a place name or station name representing a departure point, a destination, etc., a date of departure, a transportation to be used, and a name of a desired facility (step S401). The search condition input by the operation/input unit 301 is sent to the server 101 via the network 100, and is obtained by the search condition obtaining unit 201 of the server 101 (step S402). The information searching unit 203 then searches the database 202 based on the search condition obtained by the search condition obtaining unit 201 (step S403).

Subsequently, the numerical-data calculating unit 204 carries out a predetermined calculation on information obtained as a result of the search into the database 202 to calculating numerical data displayed together with a travel route (step S404). At step S404, for example, the numerical-data calculating unit 204 calculates the total of transportation fares and service charges for facilities to be used, a time required for transportations and for the entire travel schedule, a time for transportation transfer, a travel distance, etc. based on the information obtained from the database 202. Using a result of the process at steps S403 and S404, the image data generating unit 205 then generates a plurality of kinds of image data for displaying the travel route on the screen (step S405).

Specifically, the transportation-information image-data generating unit 205*a* generates image data for displaying a transportation icon that represents a transportation searched out from the transportation information database 202*a*. At the same time, the transportation-information image-data generating unit 205*a* also generates image data that indicate the numerical value of a time required for the transportation, a time for transportation transfer, a necessary fare, a service distance, etc. (calculated by the numerical-data calculating unit 204) in a case of the use of the transportation, to be displayed near the transportation icon. The facility-information image-data generating unit 205*b* generates image data for displaying a facility icon that represents each facility searched out from the facility information database 202*b*. At the same time, the facility-information image-data generating unit 205*b* generates image data that indicates the numerical value of a service charge for the facility (calculated by the numerical-data calculating unit 204), to be displayed near the facility icon.

The map image-data generating unit 205*c* generates image data for displaying map information searched out from the map database 202*c*. At the same time, the map image-data generating unit 205*c* also generates image data that indicates the numerical value of the distance between facilities to be used, and a travel distance in the entire travel route (calculated by the numerical-data calculating unit 204). The image data generated at step S405 is sent from the data transmitting unit 206 to the user terminal 102 via the network 100, and is received by the data receiving unit 303 of the user terminal 102 (step S406).

The display image controlling unit 304 controls a process of displaying the plurality of kinds of image data received at step S406 (step S407). For example, the display image controlling unit 304 so controls the display process as to display individual piece of received image data representing a travel route or a synthesis of a plurality of image data on the same screen, and as to display images exhibiting simplified information and detailed information hierarchically. The display unit 305 displays the image data controlled by the display image controlling unit 304 (step S408).

Through the above process, the travel route display system according to the embodiment of the present invention is able to display information necessary for a travel plan of a user on the same screen at the same time, the information including transportations available for the user to travel from a departure point to a destination, a time required for the transportations, a time required for transportation transfer, facilities to stop at, and maps.

EMBODIMENT

<Hardware Configuration of Travel Route Display System>

Figure 5:
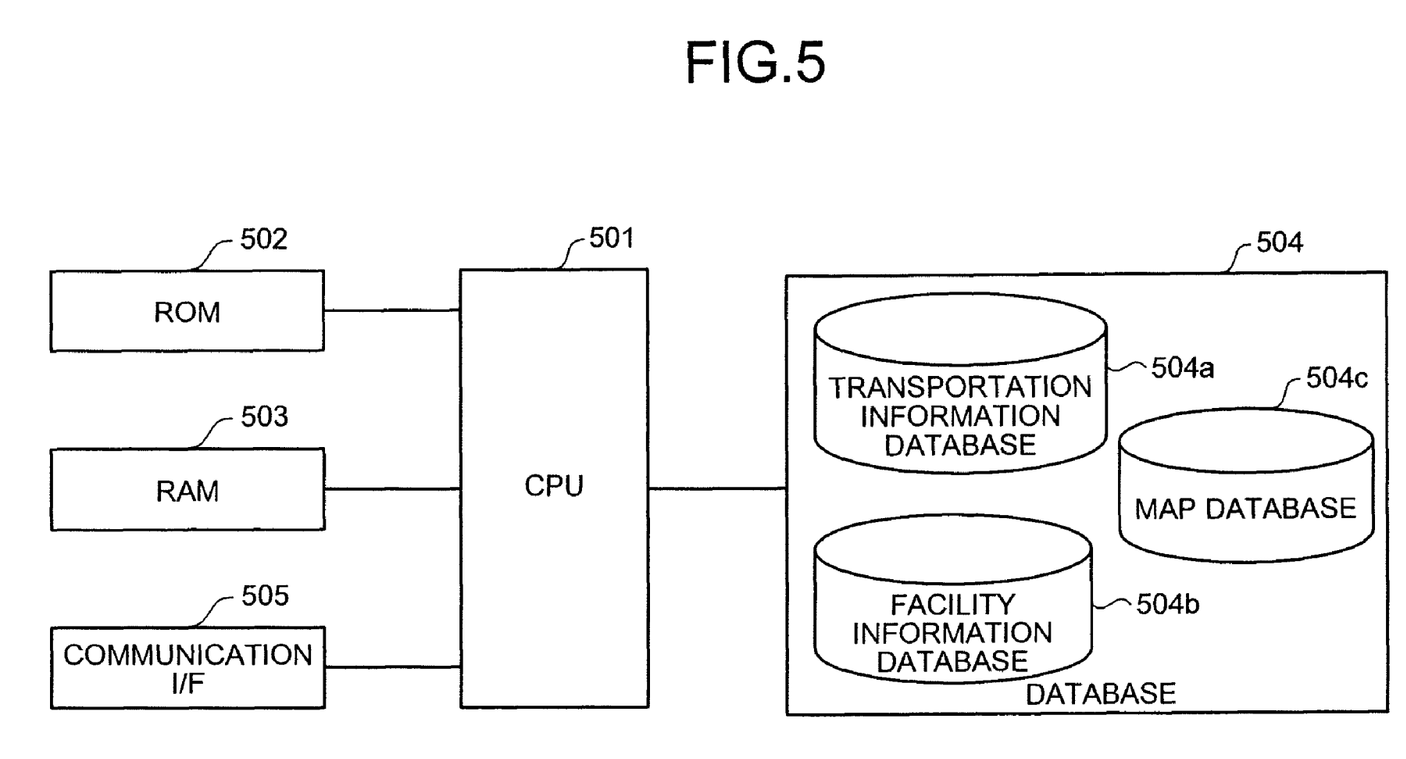
FIG. 5 is a block diagram of an example of the hardware configuration of the server.

The hardware configuration of the travel route display system according to the embodiment of the present invention will then be described. The hardware configuration of the server 101 composing the travel route display system will first be described. FIG. 5 is a block diagram of an example of the hardware configuration of the server. The server 101 includes a CPU 501, a ROM 502, a RAM 503, a database 504, and a communication I/F (interface) 505.

The CPU 501 carries out overall control over the server 101, and offers each of the functions of the search condition obtaining unit 201, information searching unit 203, numerical-data calculating unit 204, and image data generating unit 205. The ROM 502 stores a program for executing the travel route display system. The RAM 503 is used as a work area for the CPU 501.

The database 504 includes a transportation information database 504a that stores various pieces of information of transportations including train, bus, ship, and airplane, of the schedules, fares, and service distances of the transportations, etc., a facility information database 504b that stores various pieces of information of tourist facilities, theme parks, restaurants, accommodations, etc., and a map database 504c that stores map information. The database 504 is composed of, for example, a hard disk drive, a hard disk, etc.

The communication I/F 505 serves as an interface between the network 100 and the inside of the server 101, controlling data input/output from/to the user terminal 102. Specifically, the communication I/F 505 offers the function of the search condition obtaining unit 201 and of the data transmitting unit 206 shown in FIG. 2. The communication I/F 505 is composed of, for example, a modem or a LAN adaptor.

Figure 6:
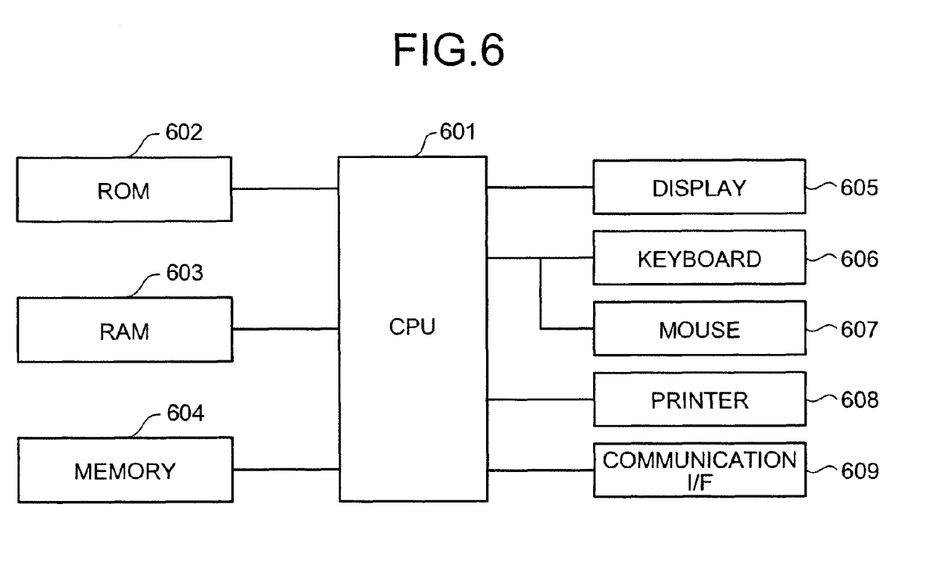
FIG. 6 is a block diagram of an example of the hardware configuration of the user terminal.

The hardware configuration of the user terminal 102 composing the travel route display system according to the present embodiment will then be described. FIG. 6 is a block diagram of an example of the hardware configuration of the user terminal. The user terminal 102 includes a CPU 601, a ROM 602, a RAM 603, a memory 604, a display 605, a keyboard 606, a mouse 607, a printer 608, and a communication I/F 609.

The CPU 601 carries out overall control over the user terminal 102, and offers the function of the display image controlling unit 304 shown in FIG. 3. The ROM 602 stores a program for executing the travel route display system. The RAM 603 is used as a work area for the CPU 601. The memory 604 is composed of, for example, a hard disk drive and a hard disk, and stores image data received by the user terminal 102. The display 605 offers the function of the display unit 305 shown in FIG. 3.

The keyboard 606 has keys for entering characters, numerals, various instructions, etc., and is used to enter a search condition, etc. The keyboard 606 may be replaced with a touch-panel-type input pad or a numeric key pad. The mouse 607 is used to move a cursor, select an input range, move a window, change the size of a window, or do other operations. The mouse 607 may be replaced with a track ball, joy stick, cross key, jog dial, etc., as long as the same function as a pointing device is provided. The keyboard 606 and the mouse 607 offer the function of the operation/input unit 301 shown in FIG. 3.

The printer 608 executes a print process on image data, etc., displayed on the display 605. The communication I/F 609 serves as an interface between the network 100 and the inside of the user terminal 102, controlling data input/output from/to the server 101. Specifically, the communication I/F 609 offers the function of the search condition transmitting unit 302 and of the data receiving unit 303 shown in FIG. 3. The communication I/F 609 is composed of, for example, a modem or a LAN adaptor.

<Procedure of Processes Executed by Travel Route Display System>

Figure 7:
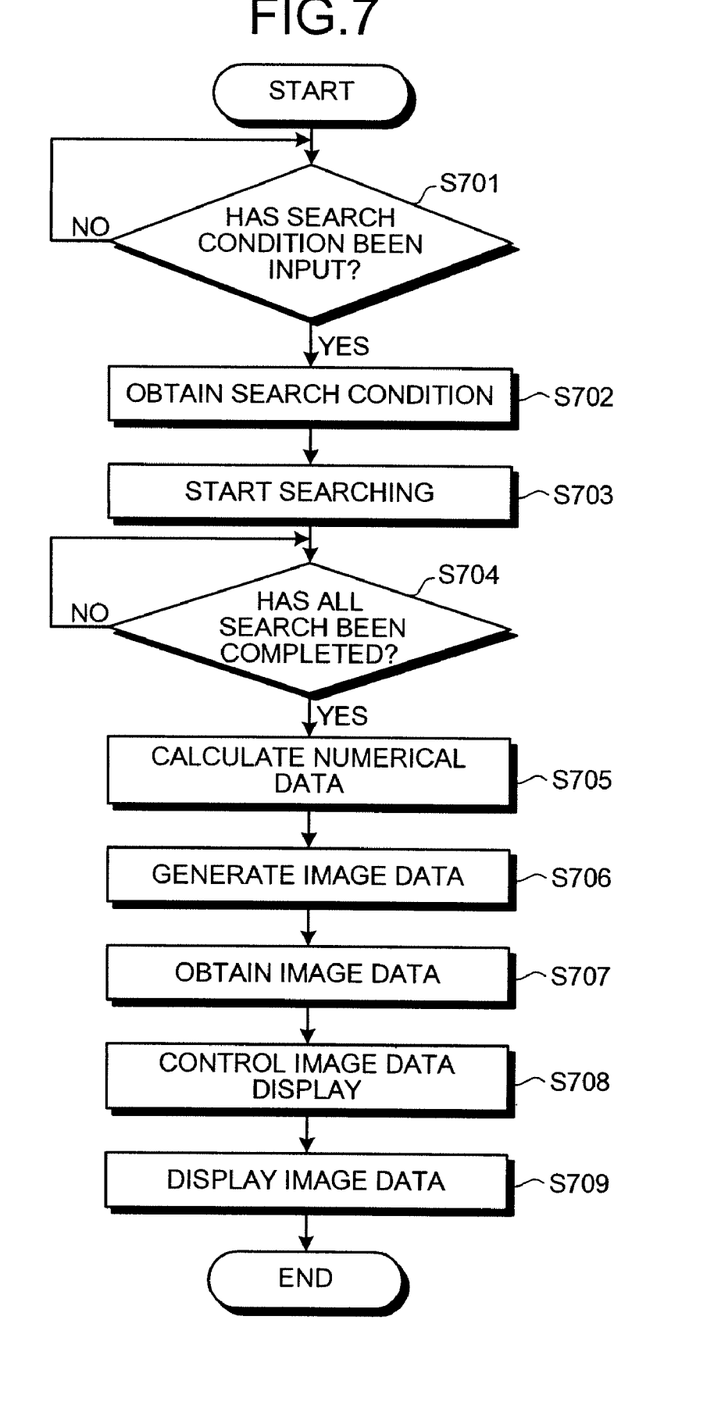
FIG. 7 is a flowchart of a procedure of processes executed by the travel route display system according to the embodiment of the present invention.

A procedure of processes executed by the travel route display system according to the embodiment of the present invention will then be described. FIG. 7 is a flowchart of the procedure of processes executed by the travel route display system according to the embodiment of the present invention.

At the start of the flowchart shown in FIG. 7, the CPU 601 detects whether input of a necessary search condition has been completed (step S701). When input of the necessary search condition has been completed (YES at step S701), the procedure proceeds to step S702. When input of the necessary search condition has not been completed (NO at step S701), the process at step S701 is executed again.

Figure 8:
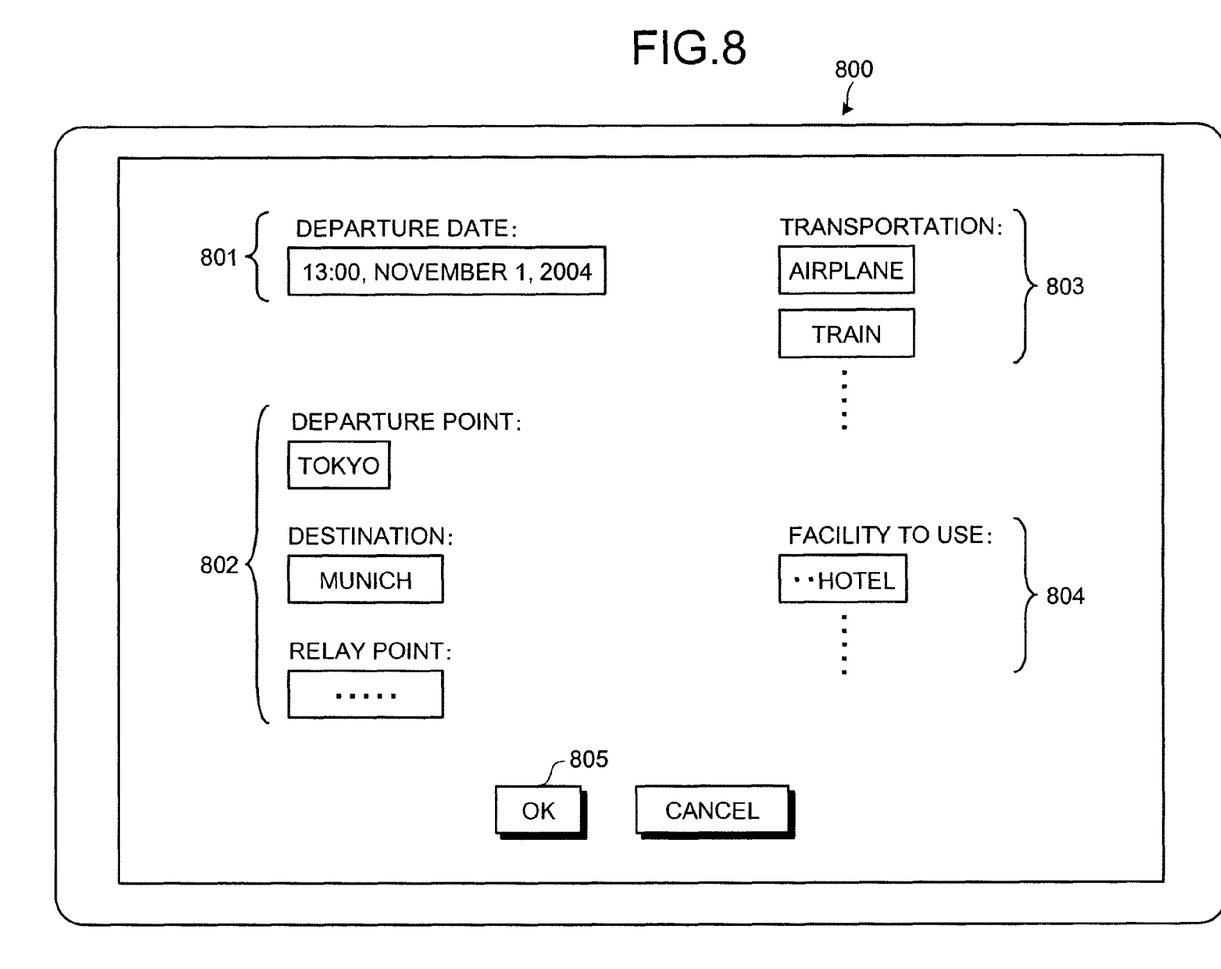
FIG. 8 is a diagram of an example of a search condition input screen.

FIG. 8 is a diagram of an example of a search condition input screen that is displayed on the display 605 of the user terminal 102 when the process at step S701 is executed. This search condition input screen 800 includes a date area 801 for inputting a date of departure, a place name input area 802 for inputting a place name (station name) representing a departure point, destination, relay point, etc., a transportation selecting area 803 for selecting a transportation to be used, and a facility name input area 804 for inputting the name of a desired facility.

When input in each area has been completed, an "OK" button 805 is pressed to end the process at step S701. In executing the process at step S701, when the "OK" button 805 is pressed before information necessary for searching is input, a message prompting re-execution of the input process at step S701 appears on the display 605.

Upon completion of the search condition input process (YES at step S701), the server 101 obtains the search condition (step S702), starting a search into the database 504 based on the search condition (step S703). At this time, the server 101 carries out the search according to a keyword presented as the search condition, thus searches the transportation information database 504a for information on transportations, searches the facility information database 504b for information on facilities, and searches the map database 504c for information on place names.

Then, the CPU 501 detects whether the search process for all search condition input at the process at step S701 has been completed (step S704). When the search process for all search condition has been completed (YES at step S704), the procedure proceeds to step S705. When the search process for all search condition has not been completed (NO at step S704), the process at step 704 is executed again.

When the search process for all search condition has been completed (YES at step S704), the CPU 501 carries out a predetermined calculation on information obtained as a result of the search, calculating numerical data displayed together with a travel route (step S705). At step S705, for example, the CPU 501 calculates a time required for individual transportation to be used and that required for transportations to be used for the entire travel schedule, a time for transportation transfer, required charges, service distances, etc., based on information obtained from the transportation information database 504a, calculates a service charge for each facility, a total service charge for all facilities to be used during the travel, etc., based on information obtained from the facility information database 504b, and calculates the distance between each facility, a travel distance in the entire travel route, etc., based on information obtained from the map database 504c.

Subsequently, the CPU 501 generates image data for displaying the travel route on the screen (step S706). Each image data for the transportation information display, for the facility information display, and for the map-related information display is generated separately.

When the user terminal 102 obtains the image data generated at step S706 (step S707), the user terminal 102 controls a process of displaying the obtained plurality of kinds of image data (step S708). At step 708, for example, the user terminal 102 so controls the display process as to display individual piece of received image data representing the travel route or a synthesis of a plurality of image data on the same screen, and as to display images exhibiting simplified information and detailed information hierarchically. The user terminal 102 thus finally displays the image data controlled at step S708 on the display 605 (step S709).

Figure 9:
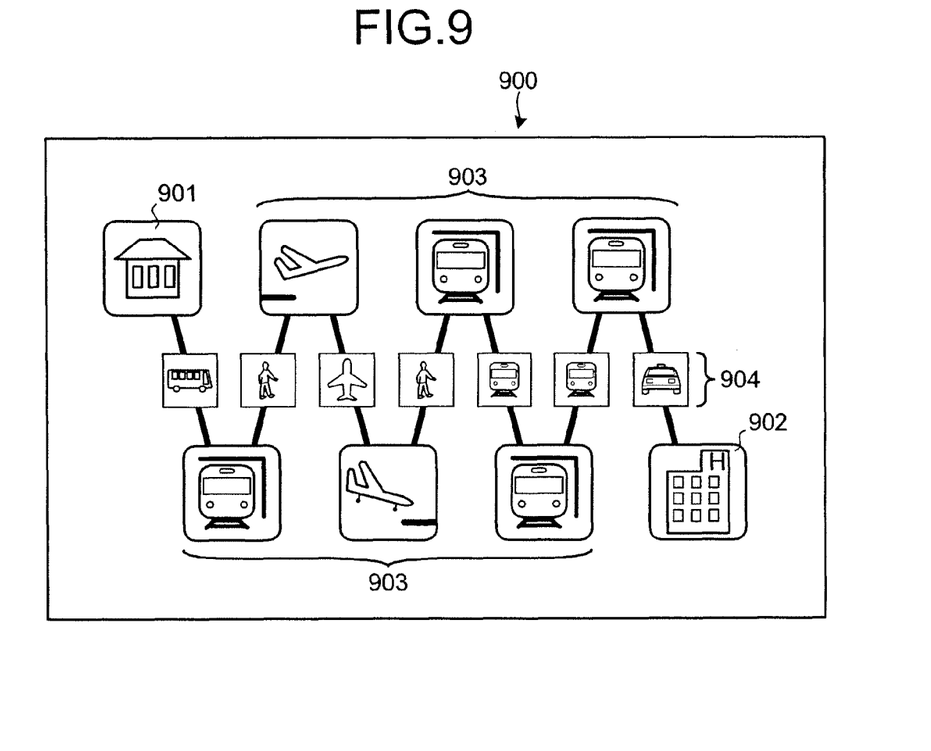
FIG. 9 is a diagram of an example of a simplified display screen displayed by the travel route display system according to the embodiment of the present invention.

FIG. 9 is a diagram of an example of a simplified display screen displayed by the travel route display system according to the present embodiment. The simplified display screen 900 simply displays the route from a departure point 901 to a destination 902, facility icons 903 representing facilities to be used (station, airport, etc.) on the course of the travel, and transportation icons 904 representing transportations to be used (train, bus, taxi, airplane, traveling on foot, etc.). This simplified display screen 900 allows a user to understand the approximate travel route at a glance.

Figure 10:
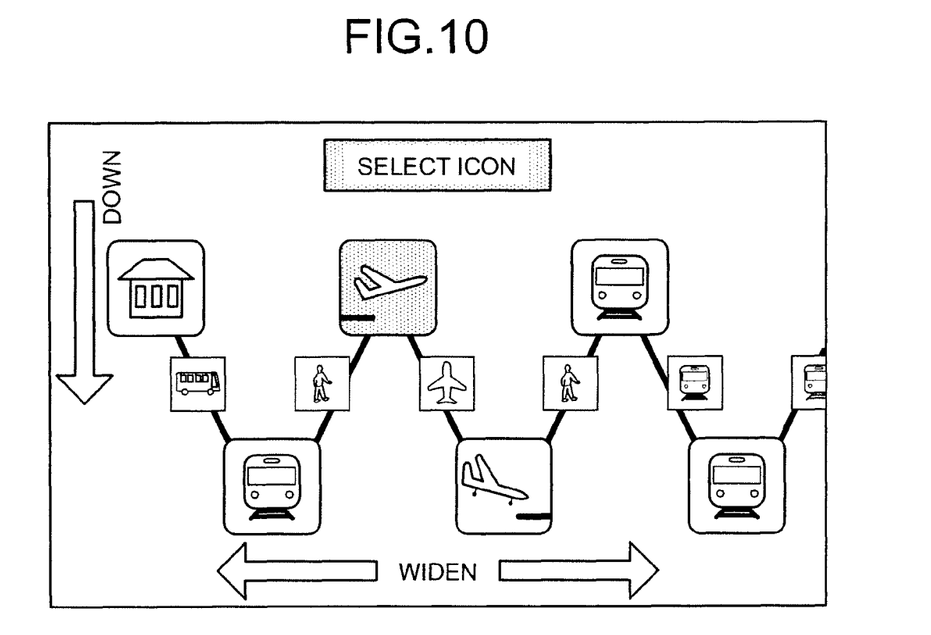
FIG. 10 is a diagram of an example of a screen showing the process of a change from the simplified display screen over to a detailed information display screen.
Figure 11:
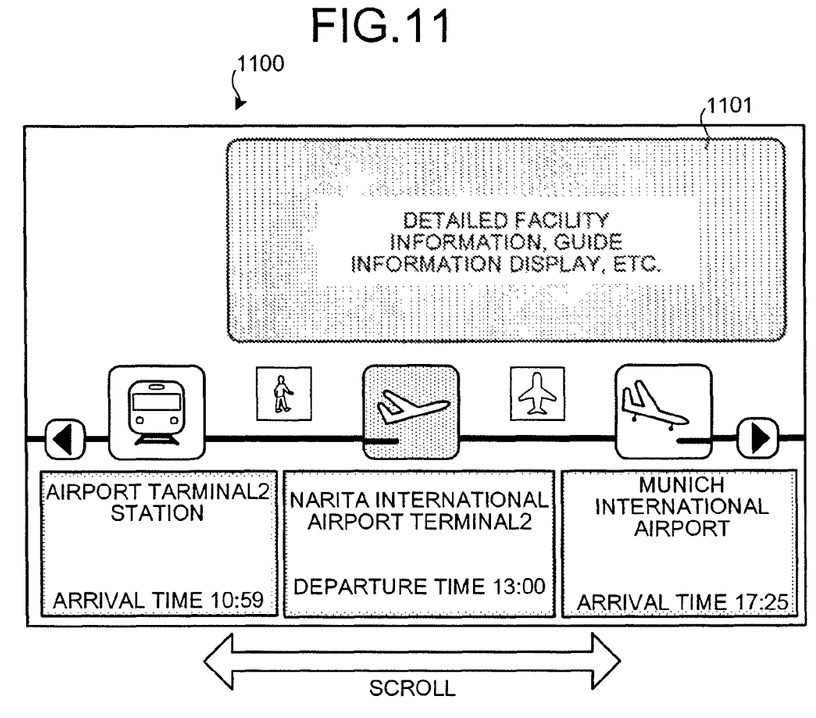
FIG. 11 is a diagram of an example of a detailed information display screen displayed by the travel route display system according to the embodiment of the present invention.

When the user wants to look into detailed information, for example, the user selects an icon providing the detailed information out of the facility icons 903 displayed on the simplified display screen 900 shown in FIG. 9. This causes each icon to move to the left/right and to the lower side on the screen, as shown in FIG. 10, which puts a detailed information display screen 1100 on display, as shown in FIG. 11. In addition to the summary information of travel route shown in FIG. 9, the detailed information display screen 1100 includes display of the names of facilities to be used, the arrival/departure times of transportations to be used, and detailed information 1101 on a facility of which detailed information is desired. When the user wants to look into detailed information of another facility, the user has to scroll the screen to the left/right to bring a necessary facility icon into display and select the icon.

Figure 12:
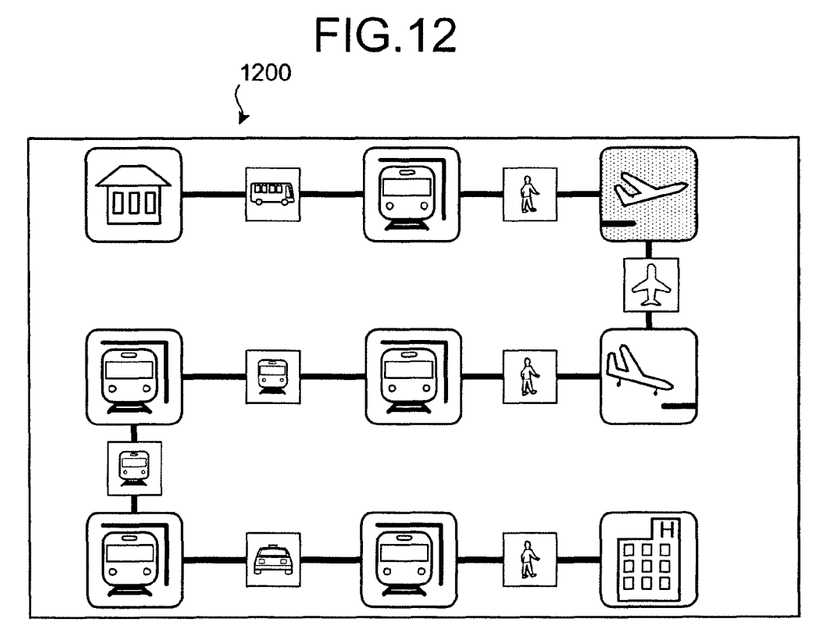
FIG. 12 is a diagram of an example of a simplified display screen displayed by the travel route display system according to the present embodiment of the present invention.
Figure 13:
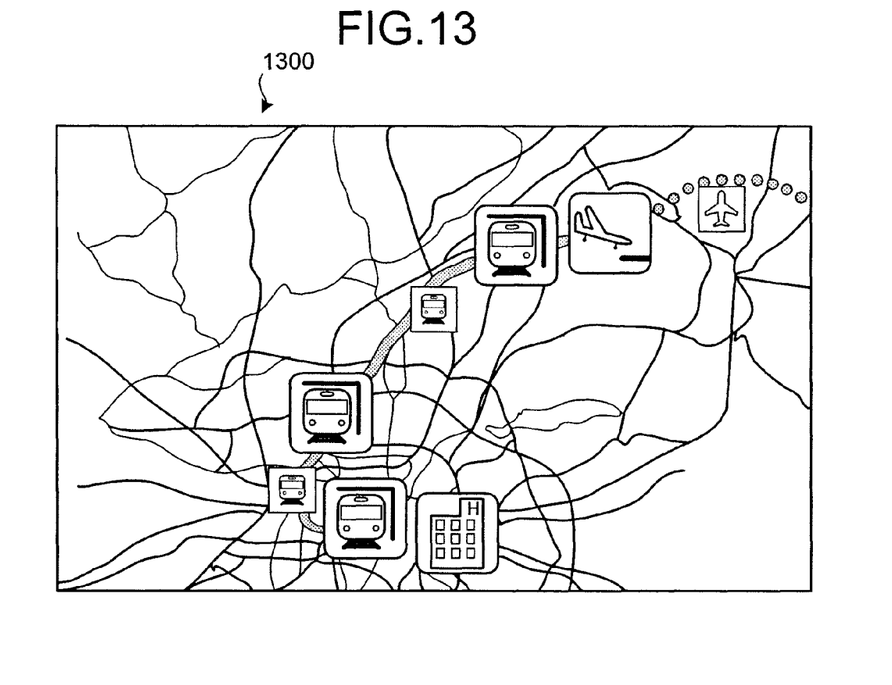
FIG. 13 is a diagram of an example of a simplified display screen displayed by the travel route display system according to the present embodiment of the present invention.

Each of FIGS. 12 and 13 is a diagram of another example of a simplified display screen displayed by the travel route display system according to the present embodiment. On the simplified display screen 1200 shown in FIG. 12, the direction of display of the travel route is set to be different from the direction of display shown in FIG. 9. On the simplified display screen 1300 shown in FIG. 13, each icon of facility and transportation to be used is arranged at each exact position on a map. Such alterations in a display method can be made by the process at step S708 shown in FIG. 7.

Figure 14:
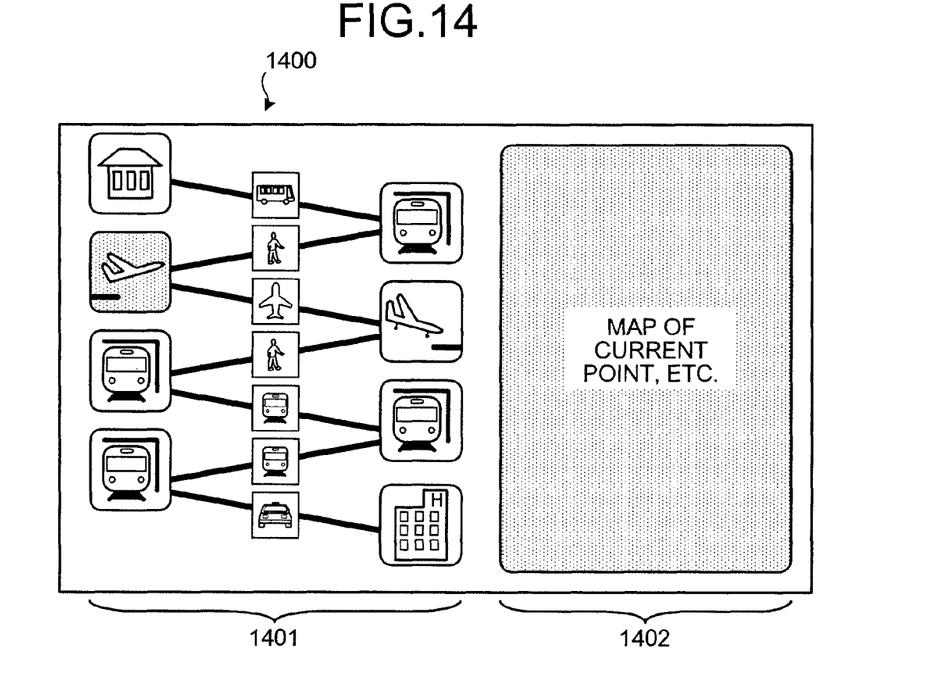
FIG. 14 is a diagram of an example of a simplified display screen displayed by the travel route display system according to the present embodiment of the present invention.
Figure 15:
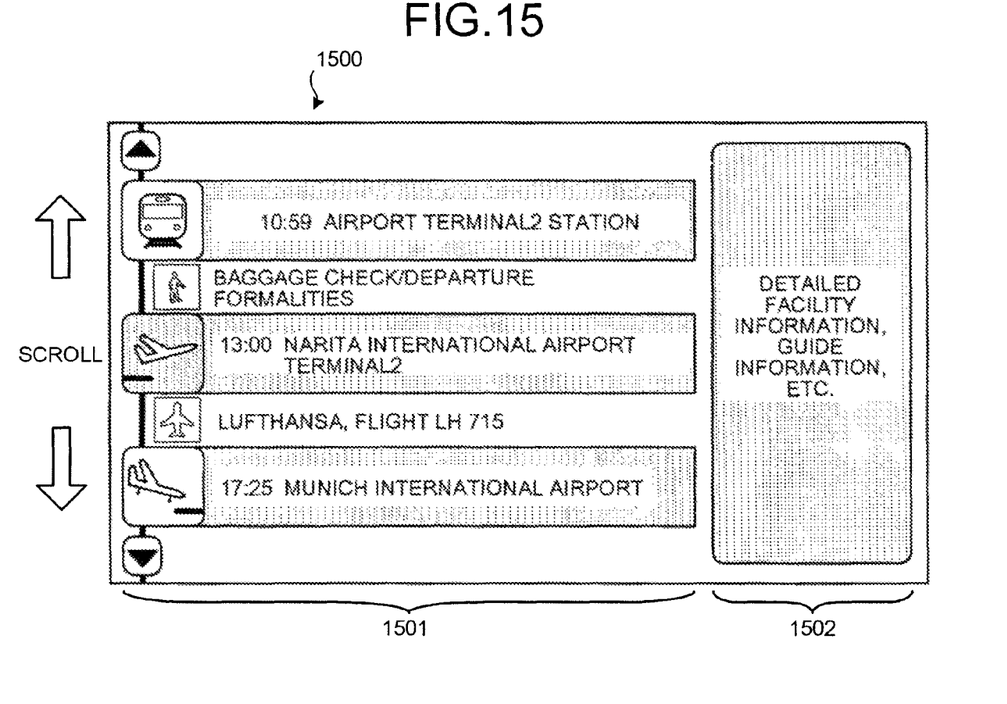
FIG. 15 is a diagram of an example of a detailed information display screen displayed by the travel route display system according to the embodiment of the present invention.

A simplified display screen displayed by the travel route display system according to the present embodiment may also be set differently as shown in FIG. 14. As shown in FIG. 14, a travel route 1401 and map information 1402 can be displayed on the left and right in parallel arrangement on a simplified display screen 1400. In this case, particularly, the display system becomes handier if the screen setting is so made that the user can see a detailed map of the vicinity of a desired facility when selecting the icon of the facility. FIG. 15 is a diagram of an example of a detailed information screen corresponding to the simplified display screen shown in FIG. 14. The detailed information screen 1500 shown in FIG. 15 displays each icon 1501 on the left and detailed information 1502 on the right in parallel arrangement, which provide the same contents as displayed in FIG. 11.

As described above, according to the travel route display system according to the embodiment of the present invention, information necessary for a travel plan of a user can be displayed simultaneously on the same screen, the information including transportations available for the user to travel from a departure point to a destination, a time required for the transportations, a time required for transportation transfer, facilities to stop at, and maps. This allows the user to understand the necessary information by looking over one screen without changing the screen.

In addition, the travel route display system allows setting of a plurality of kinds of screens each displaying detailed information. For example, the display system allows the user to display a facility to be used together with a map of the vicinity of the facility, and to display icons of facilities and transportations to be used at exact positions on a map. The travel route display system is, therefore, far more improved in convenience than a conventional system.

The travel route display method described in the present embodiment can be implemented by causing a computer, such as personal computer and work station, to execute a prepared program. This program is recorded in a computer-readable recording medium, such as a hard disk, a flexible disc, a CD-ROM, an MO, and a DVD, and is executed by the computer that reads the program out of the recording medium. The program may be a transmission medium that can be distributed via a network such as the Internet.

The invention claimed is:

1. A travel route display system comprising a server and a travel route display terminal apparatus that are connected via a network, wherein
the travel route display terminal apparatus includes:
a display unit that displays images;
an obtaining unit that obtains (1) icon data for displaying a transportation icon that represents a transportation and a facility icon that represents a facility, and (2) numerical data that are to be displayed with the facility icon;
a control unit that controls displaying of the images based on the icon data and the numerical data,
the server includes:
a search condition obtaining unit that obtains a given search condition transmitted from a user terminal;
a database that stores various pieces of information for displaying the travel route;
an information searching unit that searches the database based on the search condition obtained by the search condition obtaining unit;
a numerical-data calculating unit that calculates various numerical data based on information obtained as a result of the search into the database, the numerical data being displayed together with the facility icon;
an image data generating unit that generates the icon data and the numerical data to be displayed with the icon data, using the information obtained from the result of the search into the database by the information searching unit and the numerical data calculated by the numerical-data calculating unit; and
an image data transmitting unit that transmits a plurality of kinds of image data to the travel route display terminal apparatus, the image data being generated by the image data generating unit,
the control unit controls displaying of the images according to an input operation to provide either a simplified representation that displays the travel route from a departure point to a destination with the facility icon and the transportation icon or a detailed representation that displays the numerical data with the facility icon and the transportation icon, and
the detailed representation displays detailed information on a facility icon that is selected by the input operation and also displays the selected facility icon, another facility icon near the selected facility icon, and the transportation icon in an area that does not overlap an area where the detailed information is displayed.

2. The travel route display system according to claim 1, wherein
the database includes
a transportation information database that stores various pieces of information concerning transportation including train, bus, ship, and airplane, and schedules, fares, and service distances of the transportation;

a facility information database that stores various pieces of information concerning tourist facilities, theme parks, restaurants, and accommodations; and a map database that stores map information.

3. The travel route display system according to claim 1, wherein the numerical-data calculating unit calculates a total of transportation fares and service charges for transportation and facilities to be used, a time required for transportation to be used and for an entire travel schedule, a time for transportation transfer, and a travel distance.

4. The travel route display system according to claim 1, wherein the image data generating unit comprises:

a transportation-information image-data generating unit that generates image data for displaying information on transportation;

a facility-information image-data generating unit that generates image data for displaying information on facilities to be used; and a map image-data generating unit that generates image data for displaying a map.

5. A travel route display terminal apparatus that displays a travel route, the apparatus comprising:

a display unit that displays images;

an obtaining unit that obtains (1) icon data for displaying a transportation icon that represents a transportation and a facility icon that represents a facility, and (2) numerical data that are to be displayed with the facility icon;

a control unit that controls displaying of the images based on the icon data and the numerical data, wherein the control unit controls displaying of the images according to an input operation to provide either a simplified representation that displays the travel route from a departure point to a destination with the facility icon and the transportation icon or a detailed representation that displays the numerical data with the facility icon and the transportation icon, the detailed representation displays detailed information on a facility icon that is selected by the input operation and also displays the selected facility icon, another facility icon near the selected facility icon, and the transportation icon in an area that does not overlap an area where the detailed information is displayed.

6. The travel route display terminal apparatus according to claim 5, wherein when the facility icon is selected in the simplified representation, the control unit controls displaying of the images to display part of the travel route including the selected facility icon and a facility icon near the selected facility icon and also display the detailed information in an empty area.

7. The travel route display terminal apparatus according to claim 5, wherein the control unit controls displaying of the images such that a screen is scrolled to display another facility icon.

8. A travel route display method for displaying a travel route, the method comprising:

displaying images on a display;

obtaining (1) icon data for displaying a transportation icon that represents a transportation and a facility icon that represents a facility, and (2) numerical data that are to be displayed with the facility icon;

controlling displaying of the images based on the icon data and the numerical data, wherein in the controlling, displaying of the images is controlled according to an input operation to provide either a simplified representation that displays the travel route from a departure point to a destination with the facility icon and the transportation icon or a detailed representation that displays the numerical data with the facility icon and the transportation icon, and the detailed representation displays detailed information on a facility icon that is selected by the input operation and also displays the selected facility icon, another facility icon near the selected facility icon, and the transportation icon in an area that does not overlap an area where the detailed information is displayed.

9. A non-transitory computer-readable recording medium storing therein a travel route display program that causes a computer to execute the travel route display method according to claim 8.

* * * * *